United States Patent [19]
Klein

[11] 3,762,014
[45] Oct. 2, 1973

[54] APPARATUS FOR MAKING CAPACITORS

[75] Inventor: Gerhart P. Klein, Manchester, Mass.

[73] Assignee: P. R. Mallory & Co., Inc., Indianapolis, Ind.

[22] Filed: Jan. 22, 1971

[21] Appl. No.: 108,940

Related U.S. Application Data

[60] Continuation of Ser. No. 810,405, Sept. 23, 1968, abandoned, which is a division of Ser. No. 552,312, May 23, 1966, Pat. No. 3,422,515.

[52] U.S. Cl. .................. 29/203, 29/33, 29/420.5, 75/211
[51] Int. Cl. ............................................. H01r
[58] Field of Search ............... 62/72, 345; 29/33 M, 29/33 C, 33 R, 203 R, 203 P, 420, 420.5

[56] References Cited
UNITED STATES PATENTS

| | | | |
|---|---|---|---|
| 3,159,011 | 12/1964 | Kaluzny et al. | 62/345 |
| 3,285,029 | 11/1966 | Pansing | 62/345 |
| 3,097,419 | 7/1963 | Dickson | 29/420 |
| 3,458,916 | 8/1969 | Klein | 29/420.5 |

Primary Examiner—Charles W. Lanham
Assistant Examiner—W. Tupman
Attorney—Richard H. Childress, Robert F. Meyer and Henry W. Cummings

[57] ABSTRACT

An apparatus for fabricating anode preforms adapted for use in devices capable of performing an electrical function. The apparatus includes means for dispensing an admixture of film-forming metal powder and a freezeable compatible bonding agent, means for freezing dispensed admixture in a cavity to provide a frozen preform and means for removing the frozen preform from the cavity. The preform can be further processed as desired such as by sintering, anodizing and the like in subsequent process steps.

8 Claims, 5 Drawing Figures

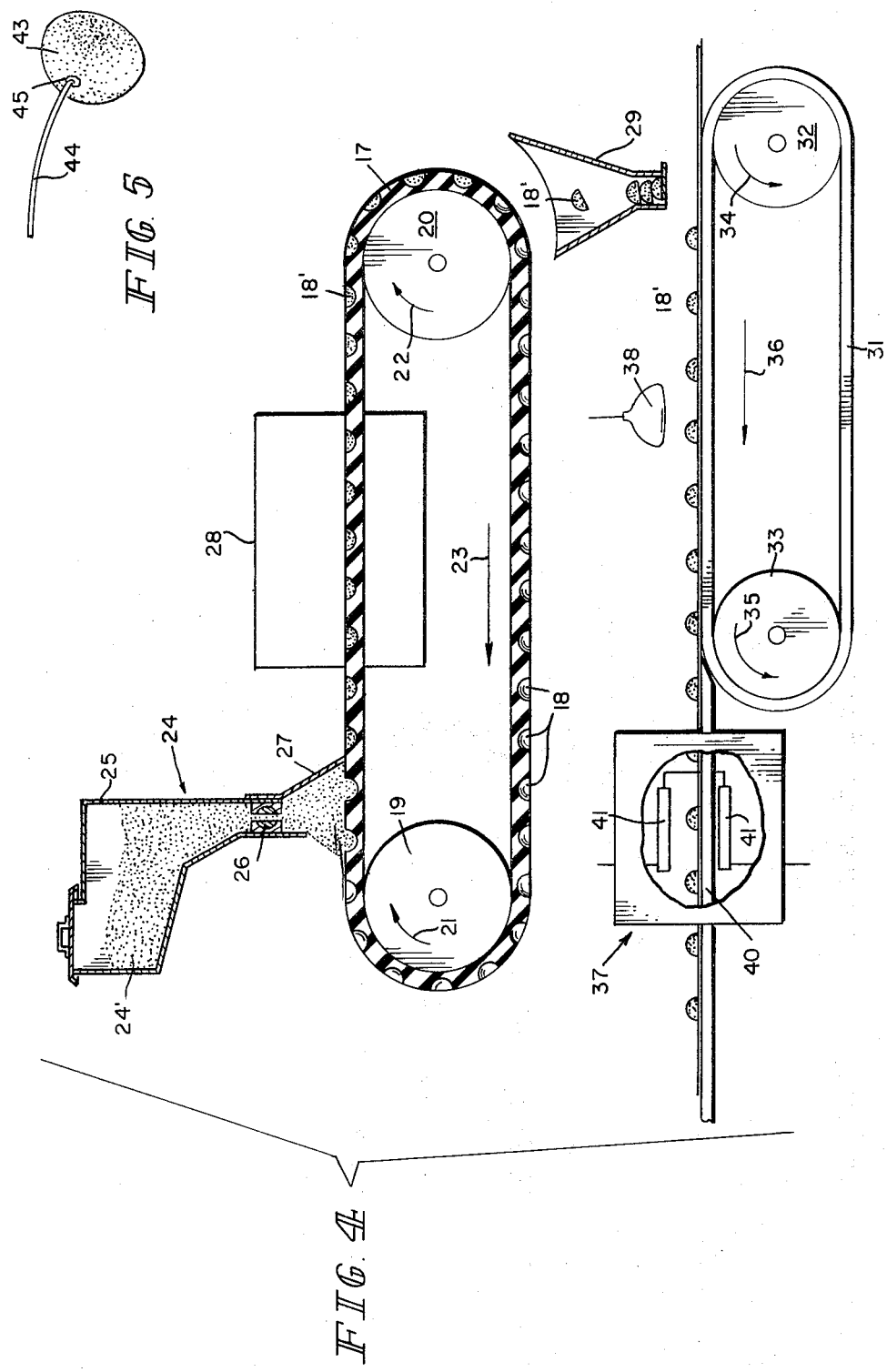

APPARATUS FOR MAKING CAPACITORS

This application is a continuation of application Ser. No. 810,405 filed Sept. 23, 1968, now abandoned, which is a division of application Ser. No. 552, 312, filed May 23, 1966 now U. S. Pat. No. 3,422,515.

The present invention relates to solid electrolytic capacitors and more particularly to an apparatus for making electrical anode preforms for solid electrolytic capacitors. In one embodiment of the present invention, a moistened mass of metallic powder is frozen and deposited on a foil. The metallic powder and foil are of the same material. After the frozen mass of powder thaws and dries, it is sintered and bonded to the foil in an appropriate furnace. Aftethe sintering and bonding operation, the resulting pellet and foil, which is an anode for the capacitor, is anodized, coated with a semiconductor layer and a conductive layer. The semiconductor and conductive layers and the terminating means attached thereto are the cathode for the capacitor. There is a terminating means attached to the foil to provide an anode lead. In another embodiment of the present invention, a frozen mass of powder is thawed, dried, and sintered to obtain a porous sintered mass of metal. A lead wire is then welded or otherwise attached to the slug to complete an anode for a solid electrolytic capacitor. An anodic oxide film, semiconductor coating and conductive coating are applied as to the porous sintered mass as discussed above.

In the past, solid electrolytic capacitors have been manufactured by the following method. A sintered porous slug of metal, obtained by pressing and sintering metallic powder, is anodized in an electrolyte to form an oxide layer on the surface thereof. The oxide layer serves as a dielectric layer for the capacitor. The porous sintered slug serves as an anode. A film of semiconductor material is deposited over the dielectric oxide layer and a film of conductive material is deposited over the semiconductor film. The semiconductor film, conductive material and terminating means attached to the conductive material comprise the cathode of the capacitor. A terminating means is attached directly to the porous sintered slug as the anode lead for the capacitor.

As a specific example of the above established general process, assume that the porous sintered slug is obtained by pressing and sintering tantalum powder. In that case, the dielectric oxide layer formed by anodization in an electrolyte, such as phosphoric acid, is tantalum oxide. The semiconductor film would preferably be manganese dioxide formed by dipping the anodized slugs in an aqueous solution of manganese nitrate and converting the manganese nitrate to manganese dioxide by pyrolysis. A typical conductive layer used on tantalum capacitors is composed of graphite and silver paint.

In the more recent past, it has been found that a porous sintered mass can be obtained by depositing a moistened mass of powder onto a film forming metal foil and sintering the powder to the foil. This particular approach solved many of the problems involved in manufacturing small solid electrolytic capacitors. For instance, several deposits can be formed on a single piece of foil and sintered thereto. The foil can then be processed as a unit until the final step where the individual capacitors are separated. Thus, the requirement for handling many small individual capacitors during process steps is eliminated. Also, the elimination of pressing and the binder usually associated therewith significantly reduces contamination problems which reduce the yield and, in some cases, produce undesirable anode characteristics.

The moistened powder has been deposited on the foil by a dropper technique and by screening a controlled amount of powder through a template. With the dropper technique, the metallic powder and a carrier liquid such as water or alcohol are placed in a dropper. When the dropper is actuated a controlled amount of powder is deposited on the foil. The dropper technique seems to be well suited for dispensing small quantities of moistened powder, typically 0.1 grams. However, to produce larger deposits, a rather large number of drops are required to obtain a controlled amount. In addition, the foil has to have depressions formed therein for containing the powder. Of course, the larger deposits require larger depressions. The screening technique solves many of the problems involved with the dropper technique, but proves to be a delicate operation. That is, after the moistened mass is deposited on the foil through the template, removal of the template without disturbing the deposits requires delicate handling procedures.

In the practice of the present invention, frozen masses or slugs of metallic powder can be deposited on flat foil as well as preformed foil. The foil may be pre-shaped to conform to the size and shape of the frozen masses of powder, thereby eliminating the requirement for cutting around each capacitor after the processing steps are completed. Upon thawing, the moist powder masses will retain their shapes since a minimum of liquid is present. After thawing, the powder masses and foil are dried and sintered. In the practice of the present invention it is also possible to sinter a mass of powder without the backing foil. In this case, a wire lead is welded or otherwise connected to the sintered slug to produce an anode.

It is to be pointed out that the basic advantages of powder which is allowed to settle in a liquid are maintained. For instance, the powder masses assume a well rounded shape and the density of the powder masses is such that only very short sintering times are required to make porous bodies suitable for manufacturing capacitors.

The amount of powder deposited by one method of the present invention is measured by a volumetric method. Cavities of predetermined size are filled with moist powder and the excess is removed. The powder masses are then frozen and can be handled freely as long as they are still frozen. In another method of the present invention, individual moistened powder droplets are frozen by dropping the droplet into a container of liquid nitrogen. The moistened powder droplets are produced by the dropper techniques previously described. After the droplets, which are substantially spherical, are frozen in liquid nitrogen, they are placed in indentations in metal foil and are thawed, dried, and sintered to the foil. The powder masses to be deposited on foil can be given any shape or size by the cavity freezing technique of the present invention. This fact provides a great degree of flexibility in capacitor fabrication.

Another advantage of the apparatus of the present invention is that the pellets or powder masses are formed independently of the moving foil. Thus, in a continuous process, the foil can move through the furnace at any desired speed. When the aforementioned dropper techniques are used, the foil can move only as fast as permitted by the dropper and, therefore, it is difficult to control the speed of a single strip of foil or to synchronize the movement of several strips of foil.

It is an object of the present invention, therefore, to provide a novel apparatus for fabricating solid electrolytic capacitors.

It is another object of the present invention to provide a novel apparatus for fabricating anodes for solid electrolytic capacitors.

It is a further object of the present invention to provide a novel apparatus for fabricating anodes for solid electrolytic capacitors wherein frozen masses of metallic powder are placed on preshaped metallic foil and are thawed, dried, and sintered to said foil.

It is yet another object of the present invention to provide an apparatus for fabricating anodes for solid electrolytic capacitors wherein the usual step of pressing metallic powder and the binder associated therewith is eliminated.

It is still another object of the present invention to provide an anode for solid electrolytic capacitors having improved characteristics compared to anodes fabricated by pressing metallic powder.

It is still a further object of the present invention to provide a porous metallic mass sintered to a metallic member so as to to provide an anode for a solid electrolytic capacitor, said porous metallic mass having a shape determined by freezing a moistened mass of metallic powder in a cavity of predetermined shape and size.

It is another object of the present invention to provide a novel apparatus for fabricating powder-on-foil solid electrolytic capacitors wherein the size of the powder mass is not limited by the amount of powder that can be accurately deposited by a dropper.

It is still a further object of the present invention to provide a novel apparatus for producing capacitor anodes wherein a frozen mass of moistened powder is thawed, dried, and sintered to obtain a porous metal slug and a lead wire is welded or otherwise attached to the slug.

It is yet another object of the present invention to provide a novel apparatus for producing capacitor anodes wherein a frozen mass of moistened powder is obtained by dropping a moistened droplet of metal powder into a container of liquid nitrogen or other suitable cooling means.

Other objects of the invention and the nature thereof will become apparent from the following description considered in conjunction with the accompanying drawings and wherein like reference numbers describe elements of similar function therein and wherein the scope of the invention is determined rather from the dependent claims.

For illustrative purposes, the invention will be described in conjunction with the accompanying drawings in which:

FIG. 4 is a view illustrating a possible setup for continuously freezing moistened powder and depositing the frozen masses of powder on a continuous strip of foil.

FIG. 5 is a perspective view of a sintered slug with a lead wire welded thereto.

Generally speaking, the present invention relates to an apparatus for making a sintered porous metallic mass which may or may not be fused to a metallic member so as to provide an anode for a solid electrolytic capacitor, said porous metallic mass having a shape determined by freezing a moistened mass of metallic powder in a cavity of predetermined shape and size or by freezing a moistened droplet of metallic powder in liquid nitrogen. After the powder deposit is frozen, it is placed on a sheet of metal, thawed and dried. The dried deposit in either sintered and fused to the sheet or presintered and removed from the sheet to provide individual slugs.

Figure 1:
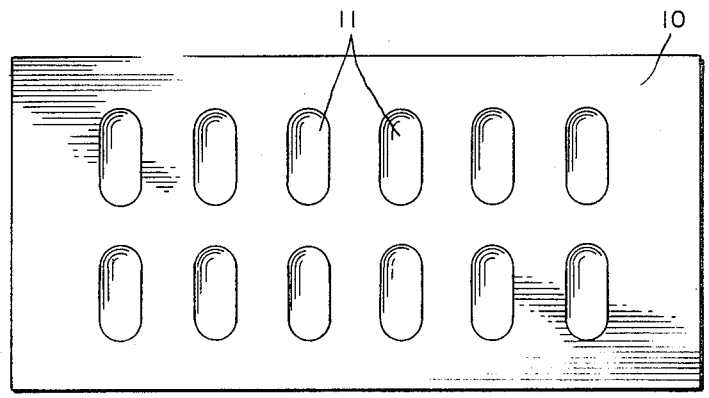
FIG. 1 is a top view of a mold used in the practice of the present invention.

Referring to the drawing, and particularly to FIG. 1, the present invention can be visualized in conjunction with the following description.

A mold 10 having a plurality of cavities 11 formed therein may be used in the practice of the present invention. The mold 10 can be made of any number of materials which will release the frozen masses of powder easily. It has been found that silicon rubber molds are particularly suitable because silicon rubber retains its elasticity to rather low temperatures and the frozen masses of powder can be removed, therefrom by flexing the molds. The shape of the cavities 11 must be such that the frozen powder masses can be released without being damaged. For instance, a cavity having a bottom larger than the opening would not be satisfactory.

The size of the cavities 11 is determined by the size of the anode to be fabricated. There are no general limits to size other than practicality. If the aforementioned powder-on-foil approach is used, the anode will usually be quite small. However, if a lead wire is to be welded or otherwise attached directly to the sintered slug without a backing foil, the anode can be as big as is normally used in solid electrolytic capacitors.

Figure 2:
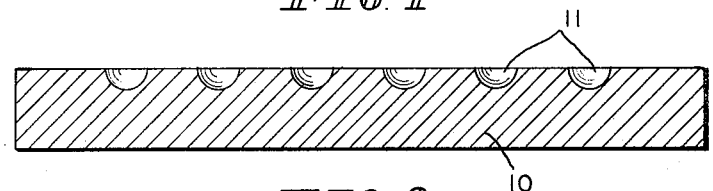
FIG. 2 is a side-sectional view of the mold shown in FIG. 1 wherein the depth of the cavities in the mold is illustrated.

A satisfactory silicon rubber mold of the type shown in FIG. 1 has been made by cutting cavities of the shape illustrated in FIGS. 1 and 2 in an aluminum plate. The cavities were 0.5 inch long, 0.25 inch wide, and 0.125 inch deep. A polyethylene mold was made by melting a polyethylene sheet in contact with the aluminum plate. The polyethylene sheet, with cavities formed therein, was used to produce the silicon rubber mold. The silicon rubber was poured over the polyethylene sheet and permitted to cure. Tantalum powder deposits frozen in the silicon rubber mold made in the manner described above weighed 1.3 grams.

Figure 3:
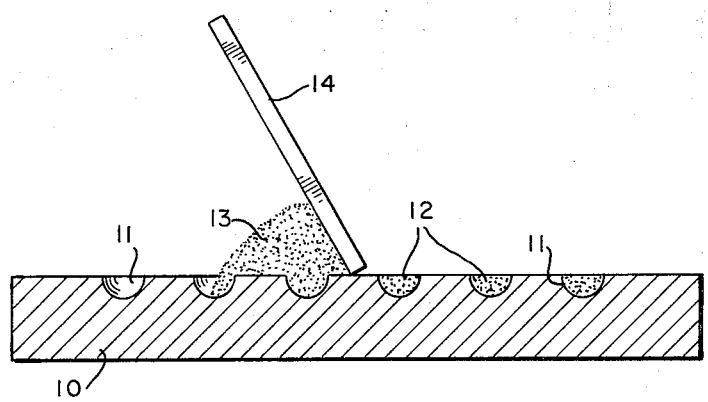
FIG. 3 is a view illustrating a simple means for depositing controlled amounts of moist powder in the cavities of the mold.

Referring now to FIG. 3, a sectional view of the mold shown in FIG. 1 can be discussed. It can be seen that the cavities 11 are formed so as to give a rounded shape to the powder deposits frozen therein. This type of deposit is generally easier to remove from the mold than other types such as deposits having square shapes.

Referring now to FIG. 3, a simplified technique for using the mold shown in FIGS. 1 and 2 can be discussed. It can be seen that the controlled deposits 12 of moistened powder are deposited in the cavities 11 by scraping a moistened mass of powder 13 across the top surface of the mold 10 with a straight edge means 14.

The excess powder is removed by the straight edge means 14 as the cavities 11 are filled.

After the cavities 11 are filled, the mold 10 and moistened deposits 12 of powder are subjected to temperatures which will solidly freeze the moistening agent, thereby hardening the deposits. After the deposits 12 are frozen, the mold 10 is flexed, or otherwise handled, so as to remove the frozen deposits. The deposits 12 are then maintained in a suitable environment until they can be placed on the receiving foil.

A mechanical refrigeration system, liquid nitrogen environment, etc., can be used to freeze the deposits 12, as well as to store them until they are placed on the receiving foil.

As stated previously frozen masses of metal powder may also be obtained by dropping moistened droplets of metal powder into a container of liquid nitrogen. This particular method will usually be limited to the smaller anodes up to 0.5 gram. After the frozen masses of powder are removed from the liquid nitrogen and either stored in a refrigerated environment or placed in small indentations in metal foil where they are sintered and bonded to the foil.

Referring now to FIG. 4, an illustrative setup for continuously freezing powder deposits and applying said deposits to a foil strip can be discussed.

There is a continuous belt 17 having cavities 18 formed therein as shown. The belt 17 is mounted on a pair of drums 19 and 20 so as to be driven thereby. The drum 19 rotates in the direction of the arrow 21 and the drum 20 rotates in the direction of the arrow 22. Consequently, the belt 17 moves in the direction of the arrow 23.

There is a powder dispensing means 24 adapted to dispense moist powder 24' into the cavities 18. The powder dispensing means is comprised of a powder container portion 25, valve means 26 for controlling the flow of moist powder 24' to the cavities 18, and straight edge means 27 for removing excess powder 24' from the cavities 18.

It can be seen that as the belt 17 moves in the direction of the arrow 23, the cavities 18 are continually filled with a controlled amount of moist powder 24'. The powder deposits are designated as 18' in FIG. 4.

There is a refrigeration means 28 disposed adjacent to the powder dispensing means 24 for freezing the moist powder deposits 18' in the cavities 18. As stated previously, the refrigeration means 28 must be capable of freezing the moist powder deposits 18' solid. It may be a mechanical refrigeration system, a liquid nitrogen system, etcc After the powder deposits 18' in the cavities 18 are frozen solid and the belt 17 continues around the drum 20, flexing of the belt 17 as it moves around the drum 20 causes the frozen deposits 18' to fall into and through a cold storage and guide means 29 to a strip of receiving foil 30. The drum 20 and portion of the belt 17 moving thereon and the cold storage and guide means 29 are maintained at a temperature which will keep the powder deposits 18' frozen until they are placed on the foil strip 30.

The foil strip 30 is initially carried by a continuous belt 31 which is mounted on drums 32 and 33. The drum 32 rotates in the direction of the arrow 34 and the drum 33 rotates in the direction of the arrow 35. Consequently, the belt 31 moves in the direction of the arrow 36 toward a sintering furnace 37.

There is a heating means 38 placed as shown for thawing and drying the frozen deposits 18'. The heating means 38 may be a simple infrared lamp.

The sintering furnace 37 includes a support member 40 adapted to receive the foil strip 30 from the belt 31 and a pair of resistance heated platens 41 for developing the sintering temperature. The sintering temperature may be developed by an induction heater as well as a resistance heater.

The powder deposits 18' are sintered and fused to the foil strip 30 in the sintering furnace 37. After sintering, the powder deposite 18' are porous sintered masses suitable for fabricating capacitor anodes.

The present invention is an ideal method for fabricating anodes for solid electrolytic tantalum capacitors. The followingl process illustrates the present invention as applied to tantalum anodes.

Tantalum powder is mixed with water and transferred onto a mold such as the mold 10 shown in FIG. 1. The excess powder is removed leaving the cavities 11 filled with a predetermined amount of moist tantalum powder. The mold with the moist tantalum powder is cooled until the water is solidified. The frozen tantalum powder deposits are then placed on tantalum foil. After the frozen deposits are placed on the tantalum foil, they are thawed and dried. The tantalum foil with the deposit disposed thereon is then placed in a sintering furnace where the tantalum powder is sintered and fused to the foil. The sintering is carried out from 1800°C to 2500°C for 1 to 60 minutes. The higher sintering temperatures require less time. For instance, a powder deposit can be satisfactorily sintered at 2200°C for about 1 minute.

The sintering must take place in an inert atmosphere or in a vacuum. It has been found that high purity tantalum powder can be adequately sintered in a high purity argon atmosphere After the tantalum powder deposits are sintered and fused to the foil, the foil and deposits disposed thereon are then anodized in an electrolyte, such as phosphoric acid, to obtain a dielectric oxide layer. A semiconductor layer, such as manganese dioxide, is deposited over the dielectric oxide layer and a conductivellayer is then deposited over the semiconductor layer. The tantalum foil and porous sintered masses of tantalum fused thereto comprise a plurality of anodes for solid electrolytic capacitors. The semiconductor layers, conductive layers and the terminating means attached to each conductive layer comprise a plurality of cathodes for said solid electrolytic capacitor. The terminating means for the anodes are connected to the tantalum foil.

After the above mentioned process steps are completed, individual capacitors are separated from the tantalum foil and packaged. Packaging may be by hermetic sealing means or by encapsulation with a suitable material such as epoxy resin.

It has been found that anodes exceeding, in weight, 0.5 grams require a somewhat different approach than the powder-on-foil approach just described. This is true because the masses of powder require rather large areas of foil and the foil has to be relatively thick in order to support the weight of the powder. Therefore, in an effort to be economical and to avoid any problems of flexing the foil due to the weight of the powder and/or the foil, the foil is eliminated and a lead wire is welded or otherwise attached to a sintered slug of metal obtained by the freezing, thawing, drying and sintering techniques described in this specification. More specifically, the pellets are produced by freezing moistened powder in cavities, placing the frozen powder masses on a sheet of the same metal, thawing the powder, drying the powder, presintering the powder, removing the resulting slugs from the sheet, and resintering the slugs. If required, the slugs may be tumbled in water to remove any loose powder particles which might have formed on the surface in contact with the sheet holding the slugs. The amount of tumbling is determined by the rigidity of the slugs which is a function of the presintering conditions. Suitable lead wires may be welded to the slugs before the resintering operation to complete the anode.

FIG. 5 is an illustration of a porous sintered slug 43 with a lead wire 44 attached thereto at the point 45. The lead wire 44 will usually be welded to the slug 43.

Porous tantalum slugs with tantalum lead wires attached thereto have been fabricated by the process just described. Frozen masses of moistened tantalum powder were thawed, dried, and presintered on a sheet of tantalum. The presintering was carried out from 1400° to 1800°C for about 30 seconds. After the resulting tantalum slugs were removed from the tantalum sheet and tumbled, tantalum lead wires were attached and the slugs were resintered at temperatures between 1800° and 2200°C for 1 minute to 30 minutes. After the resintering operation, the resulting tantalum anodes were anodized and semiconductor and conductive coatings were applied.

The present invention, as hereinbefore described, is merely illustrative and not exhaustive in scope. Since many widely different embodiments of the invention may be made without departing from the scope thereof, it is intended that all matter contained in the above description and shown in the accompanying drawing shall be interposed as illustrative and not in a limiting sense.

What is claimed is:

1. An apparatus for fabricating electrical capacitor anode preforms from an admixture of a film-forming metal powder and a freezeable compatible bonding agent comprising a conveyor having movable molding means comprising cavities corresponding to the shape of anode preforms, a container for the admixture of film-forming metal powder and freezeable compatible bonding agent, the container having means for dispensing admixture from the container at a controlled flow rate into the cavities of the molding means, means for moving the molding means of the conveyor adjacent the means of the container for dispensing admixture to substantially fill successive cavities of the molding means, refrigeration means through which the cavities substantially filled with admixture are moved to freeze the bonding agent in the cavities to bond together the film-forming metal powder in a mass having the shape of the preform, means for removing the preforms of film-forming metal powder and frozen bonding agent from the cavities of the molding means, and means for sintering the preforms.

2. The apparatus of claim 1 wherein said conveyor is an endless belt, the cavities of said molding means being formed in the surface of said belt.

3. The apparatus of claim 2 wherein said endless belt is flexible and traverses a course about a pair of spaced apart rotating drums, the flexure of said belt as it enters onto the surface of one of said drums comprising the means for removing the preforms from said cavities.

4. Apparatus according to claim 1 including means for presintering said preforms.

5. The apparatus of claim 1, comprising means for associating film-forming metal preforms with a strip of film-forming metal, and means for sintering the preforms to the strip.

6. An apparatus for fabricating electrical anode preforms from an admixture of a film-forming metal powder and a freezeable compatible bonding agent comprising a container for the admixture of film-forming metal powder and freezeable compatible bonding agent, the container having means for dispensing predetermined amounts of admixture from the container to be used as preforms, refrigeration means adjacent the means of the container for dispensing predetermined amounts of admixture to freeze the bonding agent to bond together dispensed admixture in a mass to be used as an anode preform, and means cooperatively associated with the refrigeration means to sinter powder of the anode preform and remove bonding agent from the anode preform.

7. The apparatus of claim 6, including sheet means for moving the anode preform to the means for sintering the powder of the anode preform.

8. The apparatus of claim 7, wherein the means for sintering the powder of the anode preform sinters the preform to the sheet means.

* * * * *